US010553868B2

(12) United States Patent
Takami et al.

(10) Patent No.: US 10,553,868 B2
(45) Date of Patent: Feb. 4, 2020

(54) NEGATIVE ELECTRODE ACTIVE MATERIAL, NONAQUEOUS ELECTROLYTE BATTERY, BATTERY PACK AND VEHICLE

(71) Applicant: Kabushiki Kaisha Toshiba, Minato-ku (JP)

(72) Inventors: Norio Takami, Yokohama (JP); Yasuhiro Harada, Isehara (JP); Kazuki Ise, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/435,877

(22) Filed: Feb. 17, 2017

(65) Prior Publication Data

US 2017/0162872 A1 Jun. 8, 2017

Related U.S. Application Data

(63) Continuation of application No. PCT/JP2014/081823, filed on Dec. 2, 2014.

(51) Int. Cl.
*H01M 4/485* (2010.01)
*H01M 4/131* (2010.01)
(Continued)

(52) U.S. Cl.
CPC .......... *H01M 4/485* (2013.01); *C01G 23/005* (2013.01); *C01G 23/006* (2013.01);
(Continued)

(58) Field of Classification Search
CPC .... H01M 4/485; H01M 2/1077; H01M 4/131; H01M 4/364; H01M 4/366;
(Continued)

(56) References Cited

U.S. PATENT DOCUMENTS 5,478,674 A 12/1995 Miyasaka
6,075,346 A 6/2000 Kikuchi et al.
(Continued)

FOREIGN PATENT DOCUMENTS

CN 101154729 A 4/2008
CN 102544446 A 7/2012
(Continued)

OTHER PUBLICATIONS

Wu et all. Journal of Power Sources, 272 (2014) 283-290 (Year: 2014).*
(Continued)

*Primary Examiner* — Alexander Usyatinsky
(74) *Attorney, Agent, or Firm* — Oblon, McClelland, Maier & Neustadt, L.L.P.

(57) ABSTRACT

According to one embodiment, a negative electrode active material includes particles and a carbon material. The particles is represented by $Li_{2+a}A_dTi_{6-b}B_bO_{14-c}$, where A is at least one element selected from the group consisting of Na, K, Mg, Ca, Ba, and Sr; B is a metal element other than Ti; and a, b, c, and d respectively satisfy $0 \leq a \leq 5$, $0 \leq b \leq 6$, $0 \leq c \leq 0.6$, and $0 \leq d \leq 3$. The carbon material covers at least a part of surfaces of the particles.

15 Claims, 7 Drawing Sheets

(51) Int. Cl.
| | |
|---|---|
| *H01M 2/10* | (2006.01) |
| *H01M 4/36* | (2006.01) |
| *H01M 4/58* | (2010.01) |
| *C01G 23/00* | (2006.01) |
| *C01G 33/00* | (2006.01) |
| *C01G 35/00* | (2006.01) |
| *H01M 4/62* | (2006.01) |
| *H01M 10/42* | (2006.01) |
| *H01M 4/02* | (2006.01) |

(52) U.S. Cl.
CPC ......... *C01G 33/006* (2013.01); *C01G 35/006* (2013.01); *H01M 2/1077* (2013.01); *H01M 4/131* (2013.01); *H01M 4/364* (2013.01); *H01M 4/366* (2013.01); *H01M 4/5825* (2013.01); *H01M 4/625* (2013.01); *C01P 2002/76* (2013.01); *C01P 2004/61* (2013.01); *C01P 2004/62* (2013.01); *C01P 2004/64* (2013.01); *C01P 2006/12* (2013.01); *C01P 2006/40* (2013.01); *H01M 10/4257* (2013.01); *H01M 2004/027* (2013.01); *H01M 2220/20* (2013.01)

(58) Field of Classification Search
CPC ............... H01M 4/5825; H01M 4/625; H01M 10/4257; H01M 2004/027; H01M 2220/20; C01G 23/005; C01G 23/006; C01G 33/006; C01G 35/006; C01P 2002/76; C01P 2004/61; C01P 2004/62; C01P 2004/64; C01P 2006/12; C01P 2006/40
See application file for complete search history.

(56) References Cited

U.S. PATENT DOCUMENTS

| | | | |
|---|---|---|---|
| 7,789,796 B2* | 9/2010 | Choi | B60K 6/485 477/107 |
| 9,812,704 B2 | 11/2017 | Inagaki et al. | |
| 2002/0182488 A1 | 12/2002 | Cho et al. | |
| 2004/0131941 A1 | 7/2004 | Belharouak et al. | |
| 2004/0185347 A1 | 9/2004 | Kim et al. | |
| 2004/0202934 A1 | 10/2004 | Zaghib et al. | |
| 2007/0148545 A1 | 6/2007 | Amine et al. | |
| 2008/0078594 A1 | 4/2008 | Harada et al. | |
| 2008/0226985 A1 | 9/2008 | Nobuta et al. | |
| 2009/0042095 A1 | 2/2009 | Inagaki et al. | |
| 2009/0104533 A1 | 4/2009 | Takeuchi et al. | |
| 2009/0286157 A1 | 11/2009 | Chen et al. | |
| 2009/0305132 A1* | 12/2009 | Gauthier | H01M 4/04 429/207 |
| 2011/0121240 A1* | 5/2011 | Amine | H01M 4/0402 252/502 |
| 2011/0217593 A1 | 9/2011 | Dollinger et al. | |
| 2011/0269021 A1* | 11/2011 | Fu | H01M 4/5825 429/221 |
| 2011/0293507 A1 | 12/2011 | Dambournet et al. | |
| 2012/0070744 A1 | 3/2012 | Moriyama et al. | |
| 2012/0081070 A1* | 4/2012 | Wook | B60L 11/1862 320/109 |
| 2012/0168696 A1 | 7/2012 | Huang et al. | |
| 2012/0225346 A1 | 9/2012 | Hoshina et al. | |
| 2012/0328930 A1* | 12/2012 | Inagaki | H01M 4/485 429/163 |
| 2013/0209897 A1 | 8/2013 | Paranthaman et al. | |
| 2013/0260210 A1* | 10/2013 | Takami | H01M 10/0525 429/156 |
| 2014/0001401 A1 | 1/2014 | Watanabe et al. | |
| 2014/0295231 A1 | 10/2014 | Ise et al. | |
| 2014/0306149 A1 | 10/2014 | Tarascon et al. | |
| 2014/0312269 A1 | 10/2014 | Laumann et al. | |
| 2014/0356725 A1 | 12/2014 | Zaghib et al. | |
| 2015/0001082 A1* | 1/2015 | Krishnan | B01D 57/02 204/547 |
| 2015/0010820 A1 | 1/2015 | Takami et al. | |
| 2015/0076750 A1 | 3/2015 | Huang et al. | |
| 2015/0255789 A1 | 9/2015 | Bi et al. | |
| 2015/0333326 A1 | 11/2015 | Lee et al. | |
| 2016/0226067 A1 | 8/2016 | Harada et al. | |
| 2016/0268592 A1 | 9/2016 | Inagaki et al. | |
| 2016/0268603 A1 | 9/2016 | Harada et al. | |
| 2016/0276650 A1 | 9/2016 | Hoshina et al. | |
| 2017/0005322 A1 | 1/2017 | Harada et al. | |
| 2017/0069910 A1 | 3/2017 | Harada et al. | |
| 2017/0077508 A1 | 3/2017 | Hoshina et al. | |
| 2017/0077509 A1* | 3/2017 | Ise | H01M 4/485 |
| 2017/0162872 A1 | 6/2017 | Takami et al. | |

FOREIGN PATENT DOCUMENTS

| | | |
|---|---|---|
| CN | 103811738 A | 5/2014 |
| CN | 102969492 B | 11/2014 |
| CN | 105185972 A | 12/2015 |
| CN | 106575754 A | 4/2017 |
| DE | 10 2008 050 692 A1 | 4/2010 |
| EP | 2 784 855 A1 | 10/2014 |
| EP | 3 145 004 A1 | 3/2017 |
| EP | 3 229 296 A1 | 10/2017 |
| JP | 6-310143 A | 11/1994 |
| JP | 10-208747 A | 8/1998 |
| JP | 2001-143702 | 5/2001 |
| JP | 2005-267940 | 9/2005 |
| JP | 2005267940 * | 9/2005 |
| JP | 2007-227199 A | 9/2007 |
| JP | 2008-91079 A | 4/2008 |
| JP | 2008-117648 A | 5/2008 |
| JP | 2008-542979 A | 11/2008 |
| JP | 2008542979 * | 11/2008 |
| JP | 2009-43679 A | 2/2009 |
| JP | 43765 * | 3/2009 |
| JP | 4237659 B2 | 3/2009 |
| JP | 4383782 B2 | 12/2009 |
| JP | 2010-123424 | 6/2010 |
| JP | 2010-280560 | 12/2010 |
| JP | 2013-8493 | 1/2013 |
| JP | 5221692 B2 | 6/2013 |
| JP | 2014-103032 | 6/2014 |
| JP | 5586532 B2 | 9/2014 |
| JP | 2014-238960 A | 12/2014 |
| JP | 2015-35420 A | 2/2015 |
| JP | 2015-046218 | 3/2015 |
| JP | 572604 B2 | 5/2015 |
| JP | 5726074 B2 | 5/2015 |
| JP | 2016-17083 A | 2/2016 |
| JP | 2016-146338 A | 8/2016 |
| JP | 2016-171071 A | 9/2016 |
| JP | 2016-171083 A | 9/2016 |
| KR | 10-2011-0069128 A | 6/2011 |
| KR | 10-2014-0027143 A | 3/2014 |
| KR | 10-2014-0117273 A | 10/2014 |
| WO | WO 2012/002364 A1 | 1/2012 |
| WO | WO 2012/146842 A1 | 11/2012 |
| WO | 2016/088193 A1 | 6/2016 |
| WO | 2017/073765 A1 | 5/2017 |

OTHER PUBLICATIONS

JP 2005267940 MT (Year: 2005).*
JP 43765MT (Year: 2009).*
Decision to Grant a Patent for No. 2016-510880 (Year: 2017).*
JP2008542979 MT (Year: 2008).*
International Search Report dated Feb. 24, 2015 in PCT/JP2014/081823 filed on Dec. 2, 2014 ( with English Translation).
Written Opinion dated Feb. 24, 2015 in PCT/JP2014/081823, filed on Dec. 2, 20104.
Japanese Office Action dated Oct. 11, 2016 in Japanese Application 2016-510880.
Japanese Office Action dated Jan. 24, 2017 in Japanese Application 2016-510880.

(56) References Cited

OTHER PUBLICATIONS

Japanese Office Action dated Jan. 13, 2017 in Japanese Application 2016-510880.
I. Belharouak, et al., "Li$_2$MT$_6$O$_{14}$ (M=Sr, Ba): new anodes for lithium-ion batteries" Electrochemistry Communications, vol. 5, 2003, pp. 435-438.
S. Y. Yin, et al., "Reversible lithium storage in Na$_2$Li$_2$Ti$_6$O$_{14}$ as anode for lithium ion batteries" Electrochemistry Communications, vol. 11, 2009, pp. 1251-1254.
Izumi Nakai, et al., "Funmatsu X sen Kaisetsu no Jissai (Reality of Powder X-Ray Analysis)" X-Ray Analysis Investigation Conversazione, The Japan Society for Analytical Chemistry, Asakura Publishing Co., Ltd., 2002, pp. 97-115.
International Search Report and Written Opinion dated May 10, 2016 in PCT/JP2016/052708 with Engiish transiation of categaries of cited documents.
Extended European Search Report dated Jun. 10, 2016 in Patent Application No. 16153345.0, filed Jan. 29, 2016.
Zonghai Chen, et al., "Titanium-Based Anode Materials for Safe Lithium-Ion Batteries" Advanced Functional Materials, vol. 23, XP001581750, pp. 959-969 (2013).
A. Detcheva, et al., "Analysis of single crystals based on strontium-lithium-titanium oxides by inductively coupled plasma atomic emission spectrometry" Spectrochimica Acta Part B, vol. 58, XP004703791, pp. 1481-1488 (2003).
Kaiqiang Wu, et al., "Phase composition and electrochemical performance of sodium lithium titanates as anode materials for lithium rechargeablebatteries",Journal of Power Sources, vol. 275, XP029109324, pp. 419-428 (2015).
I. Koseva, et al., "A new family of isostructural titanates, MLi$_2$Ti$_6$O$_{14}$ (M=Sr, Ba, Pb)" Journal of Alloys and Compounds, vol. 389, XP027812612, pp. 47-54 (2005).
Damien Dambournet, et al., "MLi$_2$Ti$_6$O$_{14}$ (M=Sr, Ba 2Na) Lithium Insertion Titariate Materials: A Comparative Study" Inorganic Chemistry, vol. 49, No. 6, XP055273926, pp. 2822-2826 (2010).
Extended European Search Report dated Jul. 13, 2016 in Patent Application No. 16159127.6, filed Mar. 8, 2016.
Mengmeng Lao, et al., "Preparation and Electrochemical Characterization of Li$_{2+x}$Na$_{2-x}$Ti$_6$O$_4$ (0 < x < 0.2) as anode Materials for Lithium-ion batteries" Ceramics International, ELSEVIER, vol. 41, No. 2, XP029106099, Oct. 27, 2014, pp. 2900-2907.
Pengfei Wang, et al., "Improved Lithium Storage Performance of Lithium Sodium Titanate Anode by Titanium Site Substitution with Aluminum" Journal of Power Sources, ELSEVIER, vol. 293, XP055285710, May 20, 2015, pp. 33-41.
Office Action dated Jan. 31, 2017 in Korean Patent Application No. 10- 2016-0027533.
Office Action dated Jul. 12, 2016 in Japanese Patent Application No. 2016-088601, filed Apr. 26, 2016 (with unedited computer generated English translation).
Office Action dated Jul. 12, 2016 in Japanese Patent Application No. 2016-015626, filed Jan. 29, 2016 (with unedited computer generated English translation).
Office Action dated Jul. 12, 2016 in Japanese Patent Application No. 2016-088372, filed Apr. 26, 2016 (with unedited computer generated English translation).
Office Action dated Jul. 12, 2016 in Japanese Patent Application No. 2016-041529, filed Mar. 13, 2015 (with unedited computer generated English translation).
Office Action dated Jun. 9, 2017 in U.S. Appl. No. 15/066,402, filed Mar. 10, 2016.
H. Wu, et al., "Sr-doped Li$_6$$_4$Ti$_5$O$_{12}$ as the anode material for lithium-ion batteries", Solid State Ionics, vol. 232, pp. 13-18 (2013).
Seongjun Bae, et al., "Tunable lithium storage properties of metal lithium titanates by stoichiometric modulation", Electrochemistry Communications, vol. 64, pp. 26-29 (2016).
M. Lao, et al., "Enhanced electrochemical properties of Ma2+ doped Li2NA2Ti6O14 anode material for lithium-ion batteries", Electrochmica Acta, vol. 196, pp. 642-652 (2016).
Kaiqiang Wu, et al., "Copper/Carbon Coated Lithium Sodium Titanate as Advanced Anode Material for Lithium-ion Batteries", Journal of Power Sources, Vol. 259, pp. 177-182 (2014).
Bin-Na Yun, et al., "Improved electrochemical performance of boron-doped carbon-coated lithium titanate as an anode material for sodium-ion batteries", Journal of Materials Chemistry A, 5, pp. 2802-2810 (2017).
B. Prihandoko, et al. "Variation of Carbon Coating on Li2Na2Ti6O14 as Anode Material of Lithium Battery", IOP Conference Series: Materials Science and Engineering, 202, 7 pages. (2017).
What is Carbon Black? (accessed on: Jan. 22, 2019). Retrieved from https://www.thecarycompany.com/media/pdf/specs/orion-what-is-carbon-black.pdf (Year: 2015).
Izumi Nakai, et al., "Funmatsu X sen Kaisetsu no Jissai" Reality of Powder X-Ray Analysis, X-Ray Analysis Investigation Conversazione, The Japan Society for Analytical Chemistry, 2002, with machine translation 7 pages.

* cited by examiner

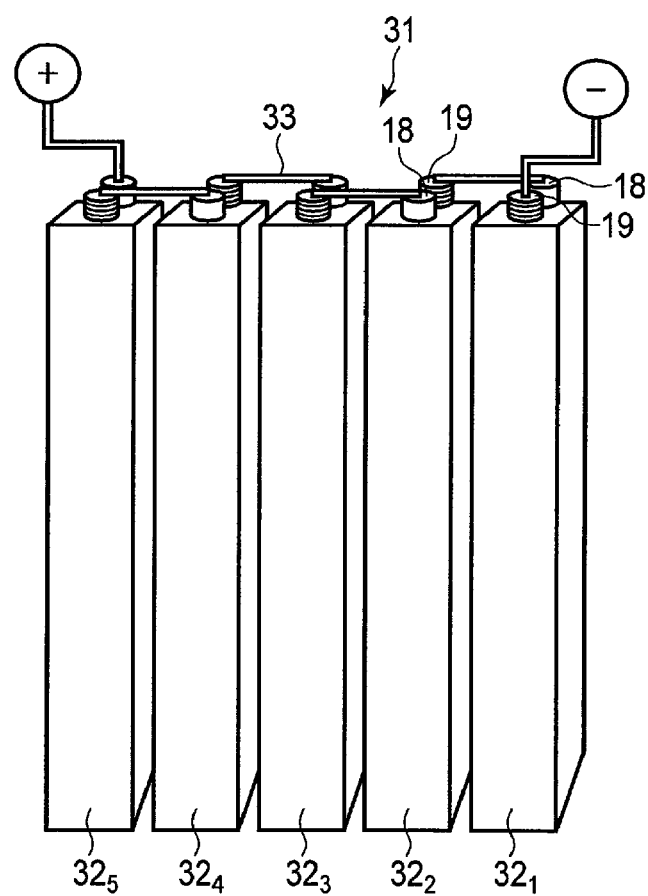
F I G. 5

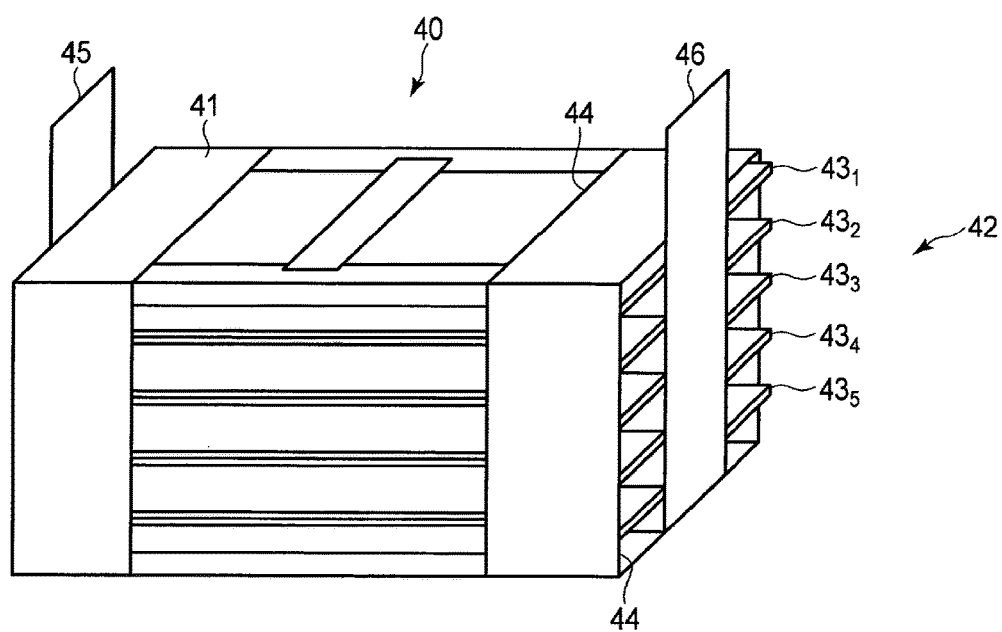
F I G. 6

NEGATIVE ELECTRODE ACTIVE MATERIAL, NONAQUEOUS ELECTROLYTE BATTERY, BATTERY PACK AND VEHICLE

CROSS-REFERENCE TO RELATED APPLICATIONS

This application is a Continuation Application of PCT Application No. PCT/JP2014/081823, filed Dec. 2, 2014, the entire contents of which are incorporated herein by reference.

FIELD

Embodiments of the present invention relate generally to a negative electrode active material, a nonaqueous electrolyte battery, a battery pack and a vehicle.

BACKGROUND

Nonaqueous electrolyte batteries including a negative electrode containing a lithium metal, a lithium alloy, a lithium compound, or a carbonaceous material are expected as high energy density batteries, and intensively studied and developed. Hitherto, lithium ion batteries including a positive electrode containing $LiCoO_2$ or $LiMn_2O_4$ as an active material, and a negative electrode containing a carbonaceous material which allows lithium ions to be inserted in and extracted from are widely used in mobile devices.

On the other hand, when the battery is installed in vehicles such as automobiles or trains, the components of the positive and negative electrodes preferably have high chemical and electrochemical stability, strength, and corrosion resistance, thereby providing high storage performance, cycle performance, and long-term reliability under high output at a high temperature (60° C. or higher) is provided. Furthermore, high performance is required in cold climate areas, and high output performance and long life performance at a low temperature (−40° C.) are desirable. From the viewpoint of improving safety performance of nonaqueous electrolytes, incombustible and nonvolatile electrolyte solutions are under development, but they are not still in actual use because they deteriorate the output properties, low temperature performance, and long life performance.

As described above, at least high temperature durability is required in order to install the lithium ion battery in the vehicle or the like. This is because poor high temperature durability makes it difficult to replace a lead storage battery mounted on the engine room of the automobile.

If the thickness of the negative electrode is decreased to increase the density for increasing the capacity in such a secondary battery, the current collector has insufficient strength, so that the battery capacity, output performance, cycle life, and reliability may be markedly limited. The decrease in the thickness of the electrode is also considered also from the viewpoint of providing high output. The particle size of the active material is large (for example, from several micrometers to tens micrometers), which makes it difficult to exploit high output. In particular, at a low temperature (−20° C. or lower), the rate of utilization of the active material is decreased, which causes difficult discharge. If the particle size of the negative electrode active material is increased in place of decreasing the thickness of the negative electrode, the interface resistance of the electrode is increased, which makes it more difficult to exploit high performance.

In the meantime, lithium iron phosphate ($Li_xFePO_4$) and lithium manganese phosphate ($Li_xMnPO_4$) attracts attentions as a lithium phosphorus metal compound having an olivine crystal structure as a positive electrode active material in order to improve the performance of a positive electrode, and the thermal stabilities thereof are improved. However, these positive electrode active materials have low electrical conductivity, which cause a problem in charge-and-discharge rate performance. Iron or manganese in the positive electrode active material is melted at a high temperature of 45° C. or higher, and deposited on the negative electrode, which accelerates deterioration in a cycle life. On the other hand, when a carbon material is used for the negative electrode, deterioration caused by metal lithium deposition is apt to be accelerated at a low temperature. Therefore, when the lithium ion battery including the positive electrode active materials is used in the automobile, it is necessary to subject the battery to air cooling or water cooling to keep the temperature of the battery as constant as possible, which causes an increase in a volume or weight and a cost increase of a battery pack.

BRIEF DESCRIPTION OF THE DRAWINGS

FIG. 5 is a perspective view showing an example of a battery module used for a battery pack of an embodiment.

FIG. 6 is a perspective view schematically showing a battery pack according to an embodiment.

DETAILED DESCRIPTION

Figure 1:
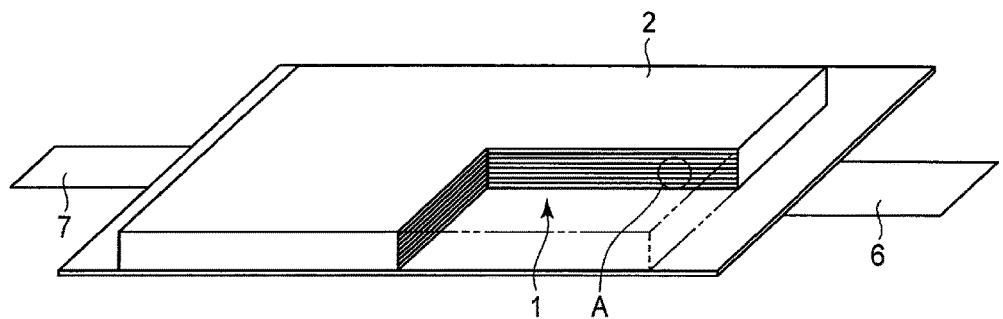
FIG. 1 is a partially cutaway perspective view showing a nonaqueous electrolyte battery according to an embodiment.

According to one embodiment, there is provided a negative electrode active material includes particles and a carbon material. The particles is represented by $Li_{2+a}A_dTi_{6-b}B_bO_{14-c}$, where A is at least one element selected from the group consisting of Na, K, Mg, Ca, Ba, and Sr; B is a metal element other than Ti; and a, b, c, and d respectively satisfy $0 \leq a \leq 5$, $0 \leq b \leq 6$, $0 \leq c \leq 0.6$, and $0 \leq d \leq 3$. The carbon material covers at least a part of surfaces of the particles.

According to the another embodiment, there is provided a nonaqueous electrolyte battery including a positive electrode, a negative electrode, and a nonaqueous electrolyte. The negative electrode includes the negative electrode active material according to the embodiment.

According to the another embodiment, there is provided a battery pack including the nonaqueous electrolyte battery according to the embodiment.

According to the another embodiment, there is provided a vehicle including the battery pack according to the embodiment.

(First Embodiment)

According to a first embodiment, a negative electrode active material is provided, which contains: particles represented by $Li_{2+a}A_dTi_{6-b}B_bO_{14-c}$ (A is at least one element selected from the group consisting of Na, K, Mg, Ca, Ba, and Sr; B is a metal element other than Ti; and a, b, c, and d represent an atomic ratio or a molar ratio, and respectively satisfy $0 \leq a \leq 5$, $0 \leq b \leq 6$, $0 \leq c \leq 0.6$, and $0 \leq d \leq 3$); and a carbon material covering at least a part of surfaces of the particles.

Since a coated film can be formed on the surface of the negative electrode including the negative electrode active material, particularly, the coated film can be formed on the carbon material during initial charge, the reductive decomposition reaction of a nonaqueous electrolyte in a negative electrode at a high temperature (for example, 45° C. or higher) can be suppressed. The negative electrode active material exhibits excellent electron conductivity even after the coated film is formed. Therefore, the negative electrode containing the negative electrode active material can reduce resistance, which can provide improvements in the high temperature cycle life performance and large current discharge performance of a nonaqueous electrolyte battery.

Although the form of the carbon material is not particularly limited, the carbon material can be used in a layer form, a particle form, or a fiber form or the like, for example. The content of the carbon material in the negative electrode active material is desirably from 0.05% by weight to 5% by weight. This can provide an improvement in the high temperature cycle life performance without largely decreasing the discharge capacity of the nonaqueous electrolyte battery as compared with the case where the carbon material is not used. The content of the carbon material is more preferably from 0.1% by weight to 3% by weight.

In $Li_{2+a}A_dTi_{6-b}B_bO_{14-c}$, the element B is preferably at least one element selected from the group consisting of V, Cr, Mn, Fe, Co, Ni, Cu, Zn, Zr, Nb, Mo, Ta, and Al. More preferably, the element B is Nb. The cycle life performance is improved by Nb. Desirably, c satisfies $0 \leq c \leq 0.6$. When c exceeds the range, the capacity is remarkably decreased. More preferably, $0 \leq c \leq 0.2$ is set. The range can provide a less decrease in the capacity of the negative electrode and high electron conductivity. On the other hand, as the range of d, $1 \leq d \leq 2.5$ is more preferably set. The potential of the negative electrode shifts to a lower potential side to provide a high battery voltage, which is preferable.

The particles represented by $Li_{2+a}A_dTi_{6-b}B_bO_{14-c}$ preferably has a crystal structure of a space group Cmca.

Examples of the specific composition of the particles represented by $Li_{2+a}A_dTi_{6-b}B_bO_{14-c}$ include $Li_{2+a}SrTi_6O_{14-c}$, $Li_{2+a}BaTi_6O_{14-c}$, $Li_{2+a}MgTi_6O_{14-c}$, $Li_{2+a}KTi_5TaO_{14-c}$, $Li_{2+a}K_{0.5}Sr_{0.5}Ta_{0.5}Ti_{5.5}O_{14-c}$, $Li_{2+a}Na_{0.5}Sr_{0.5}Ta_{0.5}Ti_{5.5}O_{14-c}$, $Li_{2+a}Sr_{0.5}Ta_{0.5}Ti_6O_{14-c}$, $Li_{2+a}NaTi_5NbO_{14-c}$, $Li_{2+a}Na_2Ti_6O_{14-c}$, and $Li_{2+a}Na_{0.5}Sr_{0.5}Ti_{5.5}Nb_{0.5}O_{14-c}$. These compositions can provide an improvement in the electron conductivity of the negative electrode active material, which can provide large improvements in large-current performance and cycle life performance. The composition to be used is not limited to one kind, and two or more kinds of particles having different compositions may be used in combination.

The negative electrode containing the negative electrode active material is used in a potential range of, preferably from 2 V to 0.5 V (from 2 to 0.5 V vs. Li/Li$^+$), and more preferably 2 V to 1 V (from 2 to 1 V vs. Li/Li$^+$) with respect to the electrode potential of a lithium metal during the insertion (charge) and extraction (discharge) of lithium ions. Even if the negative electrode containing the negative electrode active material of the embodiment is used in the potential range, the reductive decomposition of the nonaqueous electrolyte at a high temperature can be suppressed. By using the negative electrode in the potential range, the deposition of metal Li during charge at a low temperature is largely suppressed, which provides large improvements in cycle life performance and safety.

The true density of the negative electrode active material (excluding the carbon material) is preferably from 3.5 to 4.8 g/cm$^3$. The range can provide an increase in a volume ratio capacity.

The form of the negative electrode active material may be single primary particles or secondary particles, and single primary particles and secondary particles may be mixed. The secondary particles are preferably contained. The average particle size (diameter) of the primary particles is preferably set to from 0.001 to 2 μm. The average particle size of the secondary particles is preferably from 2 to 20 μm. The range can provide an increase in the filling density of the negative electrode.

The negative electrode active material is manufactured by, for example, a solid phase synthesizing method, a hydrothermal synthesizing method, and a liquid phase synthesizing method. Hereinafter, the solid phase synthesizing method using $LiSrTi_6O_{14-c}$ as an example will be described as an example of the manufacturing method of the negative electrode active material. After $SrCO_3$, $TiO_2$, and $Li_2CO_3$ as raw materials are mixed in stoichiometric proportions to obtain a mixture, the obtained mixture is subjected to a temporary firing treatment at from 400 to 700° C. for 1 to 3 hours, and pulverized to a predetermined average particle size. A sample powder is obtained by mixing the obtained sample powder in a solution containing a carbon precursor (for example, polyvinyl alcohol liquid, carboxymethyl cellulose aqueous solution or the like) and spraying the obtained dispersion liquid, followed by drying. Then, the sample powder is subjected to a main firing treatment at from 800 to 1300° C. under an inert atmosphere with an argon flow, to obtain $LiSrTi_6O_{14-c}$ particles in which at least a part of the surfaces of the particles are covered with carbon material particles. The average particle size of the primary particle sizes of the carbon material particles is 2 μm or less. The value c can be controlled by a carbon amount, a main firing temperature, and a time. According to the hydrothermal synthesizing method or the liquid phase synthesizing method, $LiSrTi_6O_{14-c}$ particles are obtained, in which at least a part of the surfaces of the particles are covered with carbon material particles. The average particle size of the primary particle size of the carbon material particles is 0.5 μm or less.

The negative electrode active material may contain a negative electrode active material other than the oxide represented by $Li_{2+a}A_dTi_{6-b}B_bO_{14-c}$. Other examples of the negative electrode active material include titanium oxide. As long as the titanium oxide allows Li or Li ions to be inserted in and extracted from, the titanium oxide may include a lithium-containing titanium oxide, and a titanium oxide containing no lithium and capable of storing lithium by charge and discharge. Examples of the titanium oxide containing lithium by synthesizing include lithium titanium oxide. Examples of the lithium titanium oxide include lithium titanium oxide having a spinel structure (for example, general formula $Li_{4/3+x}Ti_{5/3}O_4$ ($0 \leq x \leq 1$)), lithium titanium oxide having a ramsdellite structure (for example, general formula $Li_{2+x}Ti_3O_7$ ($0 \leq x \leq 1$), $Li_{1+x}Ti_2O_4$ ($0 \leq x \leq 1$), $Li_{1.1+x}Ti_{1.8}O_4$ ($0 \leq x \leq 1$), and $Li_{1.07+x}Ti_{1.86}O_4$ ($0 \leq x \leq 1$). Examples the titanium oxide containing no lithium include titanium dioxide and niobium titanium oxide. Examples of the titanium dioxide include those having a monoclinic structure, a rutile structure, and an anatase structure. Examples of the titanium dioxide having a monoclinic structure include those represented by the general formula $Li_xTiO_2$ (0≤x, more preferably 0≤x≤1), i.e., having a bronze structure (B). The composition of the titanium dioxide having a rutile structure or anatase structure before charge can be represented by $TiO_2$. Irreversible Li may remain in the titanium dioxide after charge and discharge of the battery, so that the titanium dioxide after charge and discharge of the battery can be represented by $Li_xTiO_2$ (0≤x, more preferably 0≤x≤1).

Examples of the niobium titanium oxide include those represented by $Li_aTiM_bNb_{2\pm\beta}O_{7\pm\sigma}$ (0≤a≤5, 0≤b≤0.3, 0≤β≤0.3, 0≤σ≤0.3, wherein M is one or more elements selected from the group consisting of Fe, V, Mo, and Ta).

The negative electrode containing the negative electrode active material can include a negative electrode current collector and a negative electrode material layer containing a negative electrode active material, a conductive agent, and a binder, for example. The negative electrode material layer has a porous structure, and can be supported on one surface or both surfaces of the negative electrode current collector.

The negative electrode current collector is desirably an aluminum foil or an aluminum alloy foil. The thickness of the aluminum foil and aluminum alloy foil are preferably 20 μm or less, and more preferably 15 μm or less. The purity of the aluminum foil is preferably 99.99% by weight or more. As the aluminum alloys, alloys containing one or more elements selected from magnesium, zinc and silicon or the like are preferable. On the other hand, the content of a transition metal such as iron, copper, nickel, or chromium is preferably set to 100 ppm by weight or less.

Examples of the conductive agent include acetylene black, carbon black, cokes, carbon fibers, graphite, $Li_4Ti_5O_{12}$, metal compound powders, and metal powders, and these may be used alone or as a mixture. More preferable examples of the conductive agent include carbon fibers having a fiber diameter of 1 μm or less, cokes heat-treated at a temperature of from 800° C. to 2000° C. and having an average particle size of 10 μm or less, graphite, acetylene black, and metal powders such as TiO, TiC, TiN, Al, Ni, Cu, or Fe. The conductive agent containing the carbon fibers having a fiber diameter of 1 μm or less or $Li_4Ti_5O_{12}$ can provide a decrease in electrode resistance and an improvement in cycle life performance.

Examples of the binder include polytetrafluoroethylene (PTFE), polyvinylidene fluoride (PVdF), fluorine rubbers, acrylic rubbers, styrene butadiene rubber, core-shell binders, and polyimide.

Preferably, the mixing ratios of the negative electrode active material, conductive agent, and binder are respectively from 80 to 95% by weight, from 1 to 18% by weight, and from 2 to 7% by weight.

The specific surface area of the negative electrode is preferably from 1 to 20 m²/g. The range can suppress the reductive decomposition of the nonaqueous electrolyte at a high temperature, which can provide an improvement in a cycle life. Here, the specific surface area of the negative electrode means a surface area per 1 g of the negative electrode material layer (excluding the weight of the current collector).

The porosity of the negative electrode (excluding the current collector) is desirably set to be from 20 to 50%. This makes possible to obtain a negative electrode having high affinity to the nonaqueous electrolyte and a high density. The porosity is more preferably from 25 to 40%.

The negative electrode is produced by suspending a negative electrode active material, a conductive agent, and a binder in a suitable solvent to prepare a suspended product, applying the suspended product to a negative electrode current collector, followed by drying and pressing.

The negative electrode active material of the first embodiment described above contains the particles represented by $Li_{2+a}A_dTi_{6-b}B_bO_{14-c}$ and the carbon material covering at least a part of the surfaces of the particles, which can provide improvements in the high temperature cycle life performance and large current discharge performance of the non-aqueous electrolyte battery.

(Second Embodiment)

A nonaqueous electrolyte battery according to a second embodiment includes a positive electrode, a negative electrode containing a negative electrode active material of a first embodiment, and a nonaqueous electrolyte. The nonaqueous electrolyte battery can further include a separator disposed between a positive electrode and a negative electrode, and a container member.

The form of the nonaqueous electrolyte battery may be a rectangular battery, a cylindrical battery, or a slim battery. The container member may be a metal container or a laminate film container including a metal layer and a resin layer. The laminate film container achieves the reduction in weight, which is more preferable.

Hereinafter, the members will be described.

(Positive Electrode)

A positive electrode contains a positive electrode active material. Examples of the positive electrode active material include lithium manganese composite oxides, lithium nickel composite oxides, lithium nickel cobalt composite oxides, lithium cobalt aluminum composite oxides, lithium nickel aluminum composite oxides, lithium nickel cobalt manganese composite oxides, spinel type lithium manganese nickel composite oxides, lithium manganese cobalt composite oxides, olivine type lithium phosphates, and fluorinated iron sulfates. These can achieve a high positive electrode potential.

Examples of the lithium manganese composite oxide include $Li_xMn_2O_4$ and $Li_xMnO_2$ (0≤x≤1). Examples of the lithium nickel aluminum composite oxide include $Li_xNi_{1-y}Al_yO_2$ (0≤x≤1, 0≤y≤1 (more preferably 0≤y≤1)). Examples of the lithium cobalt composite oxide include $Li_xCoO_2$ (0≤x≤1). Examples of the lithium nickel cobalt composite oxide include $Li_xNi_{1-y-z}Co_yMn_zO_2$ (0≤x≤1, 0≤y≤1 (more preferably 0<y<1), 0≤z≤1 (more preferably 0≤z≤1)). Examples of the lithium manganese cobalt composite oxide include $Li_xMn_yCo_{1-y}O_2$ (0≤x≤1, 0≤y≤1 (more preferably 0<y<1)). Examples of the spinel lithium manganese nickel composite oxide include $Li_xMn_{2-y}Ni_yO_4$ (0≤x≤1, 0≤y≤2 (more preferably 0<y<2)). Examples of the lithium phosphate having an olivine structure include $Li_xFePO_4$, $Li_xMnPO_4$, $Li_xFe_{1-y}Mn_yPO_4$, $Li_xCoPO_4$ (0≤x≤1, 0≤y≤1 (more preferably 0<y<1)), and fluorinated iron sulfates (for example, $Li_xFeSO_4F$ (0≤x≤1)). When x is 1, Li is completely extracted from the positive electrode active material by charging.

The number of kinds of the positive electrode active material may be one or two or more.

The form of the positive electrode active material may be single primary particles or secondary particles, and single primary particles and secondary particles may be mixed. The average particle size (diameter) of the primary particles can be set to 1 μm or less, and more preferably from 0.05 to 0.5 μm.

At least a part of the surfaces of the positive electrode active material particles are preferably covered with a carbon-containing material. Thus, the electron conductivity of the positive electrode active material particles can be improved. The carbon material is preferably a carbonaceous material having an interplanar spacing $d_{002}$ of 0.344 nm or more derived from (002) reflection according to the powder X-ray diffraction. Such a carbonaceous material can be formed at a low firing temperature of about 700° C. Thus, the crystallinity of the positive electrode active material particles does not become excessively high, which allows the lithium inserting-extracting performance of the positive electrode active material particles to be excellent.

Preferable examples of the positive electrode active material include a first positive electrode active material represented by $Li_xFe_{1-w}Mn_wSO_4F$ ($0 \le x \le 1.1$, $0 \le w \le 0.2$) (fluorinated sulfate compound), a second positive electrode active material (olivine phosphate compound) represented by $Li_xFe_{1-y-z}Mn_yM_zPO_4$ (M is at least one element selected from the group consisting of Mg, Al, Ti, and Zr, $0 \le x \le 1.1$, $0 \le y \le 1$, $0 \le z \le 0.2$), or both the first positive electrode active material and the second positive electrode active material. Thereby, the decomposition reaction of the nonaqueous electrolyte at a high temperature can be suppressed, and the charge-and-discharge cycle life of the battery can be largely improved.

An oxide of at least one metal selected from the group consisting of cobalt, nickel, and manganese may be added to the positive electrode containing the second positive electrode active material. Preferable examples of the oxide of the at least one metal include $Li_xCoO_2$ ($0<x<1$), $LiNi_{1-e}Co_eMn_fO_2$ ($0<e<1$, $0<f<1$), and $Li_xMn_2O_4$ ($0<x<1$). The addition of 30% by weight or less of the oxide of the at least one metal provides an increase in an electrode density, which provide an improvement in the volume ratio capacity of an electrode. The oxide of the at least one metal may be used alone or in combination of two or more.

The operating voltage of the nonaqueous electrolyte battery of the embodiment including the positive electrode containing the first positive electrode active material and/or the second positive electrode active material, and the negative electrode containing the negative electrode active material of the first embodiment is set to be from 2.5 to 1.6 V (intermediate voltage: 2.17 V) when containing the first positive electrode active material, and from 3 to 1.8 V (intermediate voltage: from 2.66 to 2 V) when containing the second positive electrode active material. The intermediate voltage is set to be from 2.4 to 2.05 V when containing both the first positive electrode active material and the second positive electrode active material.

The average operating voltage of the nonaqueous electrolyte battery of the embodiment can be set to be higher by from about 0.15 V to about 0.5 V than that of a nonaqueous electrolyte battery containing a negative electrode active material consisting of lithium titanium oxide or titanium dioxide. As a result, if the nonaqueous electrolyte batteries of the embodiment are connected in series to constitute a battery module, a high battery module voltage can be obtained by the low number of the batteries, which can provide reductions in size and weight of a battery pack.

The operation voltage range of the battery module in which the nonaqueous electrolyte batteries of the embodiment are connected in 5 series or 6 series is from 15 V to 10 V, which allows a parallel system with a lead storage battery or the substitution of the lead storage battery. Since the battery module can achieve high output and large current discharge in the range of from 15 V to 10 V, and more preferably from 15 V to 13 V, the battery module is used for a battery pack of an idling stop vehicle (ISS) with a regenerative function, or a microhybrid automobile. The battery pack including the battery module of the embodiment can be installed in an engine room of the automobile from high temperature durability and high safety, which can provide an improvement in an occupancy room of the automobile. Similarly, since the operation voltage range of the battery module in which the nonaqueous electrolyte batteries of the embodiment are connected in from 18 series to 24 series can be adapted into the range of from 54 V to 24 V, the battery module is used for the microhybrid automobile.

The positive electrode can contain a positive electrode current collector, and a positive electrode material layer containing a positive electrode active material, a conductive agent, and a binder. The positive electrode material layer has a porous structure, and can be supported on one surface or both surfaces of the positive electrode current collector.

Examples of the conductive agent include acetylene black, carbon black, graphite, and carbon fibers. Particularly, vapor grown carbon fibers having a fiber diameter of 1 μm or less are preferable. The use of the carbon fibers can improve an electrical conductivity network in the positive electrode, which can provide a large improvement in the output performance of the positive electrode. When the carbon fibers having a fiber diameter of 1 μm or less are contained, the increased electron conductivity resistance of the positive electrode can be improved by the network of the carbon fibers having a thin fiber diameter, and thereby the resistance of the positive electrode can be effectively reduced.

Examples of the binder include polytetrafluoroethylene (PTFE), polyvinylidene fluoride (PVdF), fluorine rubber, and acrylic acid.

It is preferable that the mixing ratios of the positive electrode active material, conductive agent, and binder are respectively from 80 to 95% by weight, from 3 to 19% by weight, and from 1 to 7% by weight.

The positive electrode is produced by suspending a positive electrode active material, a conductive agent, and a binder in a suitable solvent to prepare a suspended product, applying the suspended product to a positive electrode current collector, followed by drying and pressing.

The specific surface area of the positive electrode material layer measured by the BET method is measured as with the negative electrode, and is preferably from 0.1 to 10 m$^2$/g.

Examples of the positive electrode current collector include an aluminum foil and an aluminum alloy foil. The thickness of the positive electrode current collector can be set to 20 μm or less, and more preferably 15 μm or less.

(Nonaqueous Electrolyte)

The nonaqueous electrolyte is a liquid, gel-like, or solid electrolyte having lithium ion conductivity or sodium ion conductivity. Examples of the liquid nonaqueous electrolyte include an organic electrolyte solution and an ionic liquid. Examples of the gel-like nonaqueous electrolyte include a gel-like organic electrolyte obtained by mixing a liquid organic solvent and a polymer material. Examples of the solid nonaqueous electrolyte include a polymer solid electrolyte and an inorganic solid electrolyte.

The liquid nonaqueous electrolyte is prepared by dissolving a lithium electrolyte in an organic solvent at a concentration of from 1.5 to 3 mol/L, for example. Accordingly, high output can be achieved even at a low temperature. When the lithium salt concentration is lower than 1.5 mol/L, the lithium ion concentration at the interface between the positive electrode and the nonaqueous electrolyte may be rapidly lowered during discharge at a high rate so as to lower the output. On the other hand, when the lithium salt concentration exceeds 3 mol/L, the viscosity of the nonaqueous electrolyte is increased, which brings about the possibility that the migrating rate of the lithium ion is lowered so as to lower the output. The concentration is more preferably from 0.5 to 2.5 mol/L. A sodium salt may be used in place of the lithium electrolyte.

Examples of the lithium electrolyte include $LiBF_4$, $LiPF_6$, $LiAsF_6$, $LiClO_4$, $LiCF_3SO_3$, $LiN(FSO_2)_2$, $LiN(CF_3SO_2)_2$, $LiN(C_2F_5SO_2)_2$, $Li(CF_3SO_2)_3C$, and $LiB[(OCO)_2]_2$. The electrolyte may be used alone or in combination of two or more. Among them, $LiPF_6$, $LiBF_4$, or $LiN(FSO_2)_2$ is preferably contained. Thus, the chemical stability of the organic solvent can be improved and the film resistance on the negative electrode can be reduced, which can provide significant improvements in low temperature performance and cycle life performance.

Examples of the organic solvent include cyclic carbonates such as propylene carbonate (PC) or ethylene carbonate (EC); linear carbonates such as diethyl carbonate (DEC), dimethyl carbonate (DMC), or methylethyl carbonate (MEC); linear ethers such as dimethoxyethane (DME) or diethoxy ethane (DEE); cyclic ethers such as tetrahydrofuran (THF) or dioxolane (DOX); γ-butyrolactone (GBL), 2-methyl-γ-butyrolactone (MBL), acetonitrile (AN), 3-methoxypropionitrile (MOPN), and sulfolane (SL). These organic solvents can be used alone or in the form of a mixture of two or more kinds thereof. Particularly, it is preferable to mainly contain propylene carbonate (PC), ethylene carbonate (EC), or γ-butyrolactone (GBL), since the boiling point becomes 200° C. or higher and the thermal stability becomes higher. Particularly, since it is possible to dissolve a lithium salt in a solvent at a high concentration when γ-butyrolactone (GBL), 2-methyl-γ-butyrolactone (MBL), or 3-methoxypropionitrile (MOPN) is contained, the stability (high boiling point, high flash point, low steam pressure) at a high temperature is improved, and the output performance at a low temperature is also improved.

Examples of the ionic liquid include a room temperature molten salt (ionic liquid) containing lithium ions. The room temperature molten salt (ionic liquid) preferably contains a lithium ion, an organic cation, and an anion. It is desirable that the room temperature molten salt remains in a liquid form at room temperature or lower. Hereinafter, an electrolyte containing a room temperature molten salt will be described.

The room temperature molten salt means a salt in which at least a part of the salt exhibits a liquid form at room temperature. The room temperature means a temperature range in which the power source is assumed to be normally operated. As for the temperature range in which the power source is assumed to be normally operated, the upper limit is about 120° C., in some cases about 60° C. The lower limit is about −40° C., in some cases about −20° C. Among them, the temperature range of from −20° C. to 60° C. is suitable.

Examples of the organic cation include alkyl imidazolium ions having a skeleton shown in Chemical Formula 1 below and quaternary ammonium ions.

[Chemical Formula 1]

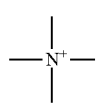

Preferable examples of the alkyl imidazolium ions include dialkyl imidazolium ions, trialkyl imidazolium ions, and tetraalkyl imidazolium ions. Preferable examples of dialkyl imidazolium include 1-methyl-3-ethyl imidazolium ions ($MEI^+$).

Preferable examples of the trialkyl imidazolium ions include 1,2-diethyl-3-propyl imidazolium ions ($DMPI^+$).

Preferable examples of tetraalkyl imidazolium ions include 1,2-diethyl-3,4(5)-dimethyl imidazolium ions.

Preferable examples of the quaternary ammonium ions include tetraalkyl ammonium ions and cyclic ammonium ions. Preferable examples of tetraalkyl ammonium ions include dimethyl ethyl methoxyethyl ammonium ions, dimethyl ethyl methoxymethyl ammonium ions, dimethyl ethyl ethoxyethyl ammonium ions, and trimethyl propyl ammonium ions.

When the alkyl imidazolium ions or the quaternary ammonium ions (particularly, tetraalkyl ammonium ions) are used, the melting point can be adjusted to 100° C. or lower, and more preferably 20° C. or lower. Furthermore, the reactivity with the negative electrode can be reduced.

The concentration of the lithium ions is preferably 20 mol % or less. The concentration is more preferably from 1 to 10 mol %. When the concentration is adjusted to the range described above, the liquid room temperature molten salt can be easily obtained even at a low temperature such as 20° C. or lower. The viscosity can be reduced even at temperatures lower than room temperature, which can provide an increase in ion conductivity.

The anion preferably coexists with one or more anions selected from $BF_4^-$, $PF_6^-$, $AsF_6^-$, $ClO_4^-$, $CF_3SO_3^-$, $CF_3COO^-$, $CH_3COO^-$, $CO_3^{2-}$, $(FSO_2)_2N^-$, $N(CF_3SO_2)_2^-$, $N(C_2F_5SO_2)_2^-$, and $(CF_3SO_2)_3C^-$ or the like. The anions are coexistent, and thereby a room temperature molten salt having a melting point of 20° C. or lower can be easily formed. More preferable examples of the anion include $BF_4^-$, $(FSO_2)_2N^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. These anions allow a room temperature molten salt at 0° C. or lower to be more easily formed.

Examples of the solid nonaqueous electrolyte include lithium metal oxide, lithium metal sulfide, or a solid nonaqueous electrolyte obtained by mixing a lithium salt electrolyte and a polymer material. Examples of the polymer material include polyvinylidene fluoride (PVdF), polyacrylonitrile (PAN), and polyethylene oxide (PEO).

(Separator)

A separator can be disposed between the positive electrode and the negative electrode. Examples of the form of the separator include a non-woven fabric and a porous film. Examples of the material of the separator include cellulose and polyolefin. The number of kinds of the material to be used may be one or two or more. Preferable examples of the separator include a non-woven fabric or porous film having a thickness of 30 μm or less and a porosity of 50% or more and containing cellulose or polyolefin.

In particular, a separator including cellulose fiber and having a porosity of 60% or more is preferably used. The separator has excellent impregnation properties of the electrolyte, and can achieve high output performance from low to high temperatures. By combining the separator with the negative electrode of the embodiment, the separator having a porosity of 60% or more does not react with the negative electrode even during long-term charge storage, float charge, or over-charge. The problem of the short circuit between the negative electrode and the positive electrode caused by deposition of dendrites of lithium metal does not occur. The porosity is more preferably from 62% to 80%. The diameter of the cellulose fiber is preferably 10 μm or less. Thereby, the affinity with the nonaqueous electrolyte can be improved to reduce the battery resistance. More preferably, the fiber diameter is 3 µm or less. Examples of the form of the separator include non-woven fabric, film, and paper forms.

Preferably, the thickness of the separator is from 20 to 100 µm and the density is from 0.2 to 0.9 g/cm$^3$. When these items are in the above ranges, the balance between mechanical strength and a reduction in battery resistance can be kept, which can provide a battery which has high output and is reduced in the development of internal short circuits. Heat-shrinkage at a high temperature is reduced and good high temperature storage performance can be achieved.

(Container Member)

Examples of the container member include laminate film containers having a thickness of 0.2 mm or less, and metal containers having a thickness of 0.5 mm or less. The shape of the container is changed depending on the form of the nonaqueous electrolyte battery. Examples of the form of the nonaqueous electrolyte battery include flattened, prismatic, cylindrical, coin-type, button-type, sheet-shaped, and laminate-type non-aqueous electrolyte batteries, and large-size batteries installed in electric automobiles or the like.

The thickness of the laminate film is more preferably 0.5 mm or less. The thickness of the laminate film desirably has a lower limit of 0.01 mm.

On the other hand, the thickness of the metal container is more preferably 0.5 mm or less. The thickness of the metal container desirably has a lower limit of 0.05 mm.

Examples of the laminate film include a multilayer film including a metal layer and a resin layer for coating the metal layer. For the reduction in weight, the metal layer is preferably an aluminum foil or an aluminum alloy foil. The resin layer is intended to reinforce the metal layer, and can be formed from polymers such as polypropylene (PP), polyethylene (PE), nylon, or polyethylene terephthalate (PET). The number of kinds of the resin may be one or more.

The laminate film container is obtained by, for example, sealing the laminate film through thermal fusion bonding.

The metal container is desirably formed from aluminum or an aluminum alloy. The strength of the metal container made of the aluminum alloy is increased, which can ensure sufficient mechanical strength even when the thickness of the container is reduced. This can improve the radiation performance of the container, and thus suppress the increase in a battery temperature. The improvement in an energy density also allows the reductions in the weight and size of the battery. These features are suitable for batteries requiring high-temperature conditions and high energy densities or the like, for example, batteries installed in vehicles. An alloy containing at least one element selected from magnesium, zinc, and silicon or the like is preferable as the aluminum alloy. On the other hand, in each of the aluminum and aluminum alloy, the content of a transition metal such as iron, copper, nickel, or chromium is preferably 100 ppm or less.

The metal container can be sealed with the use of laser. For this reason, as compared with the laminate film container, the volume for sealing can be reduced, and the energy density can be improved.

The nonaqueous electrolyte battery of the embodiment may be applied to nonaqueous electrolyte batteries of various forms such as angular, cylindrical, flat, slim, or coin batteries.

Specific examples of the forms include an angular or cylindrical battery including a metal container member, and a slim battery including a laminate film container member.

Figure 2:
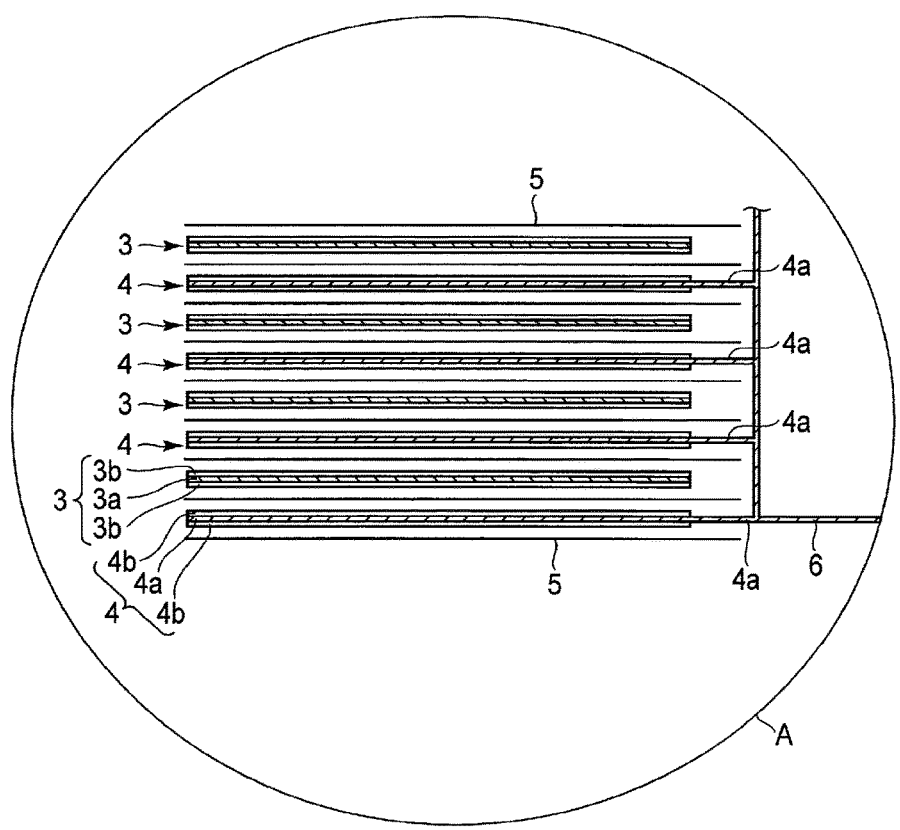
FIG. 2 is an enlarged cross-sectional view of a part A of FIG. 1.

FIGS. 1 and 2 show an example of the nonaqueous electrolyte battery including a laminate film container.

A laminated electrode group 1 is housed in a bag container 2 made of a laminate film which includes a metal layer sandwiched between two resin films. As shown in FIG. 2, the laminated electrode group 1 has a structure wherein positive electrodes 3 and negative electrodes 4 are alternately laminated, with separators 5 sandwiched therebetween. A plural of positive electrodes 3 are present, and each of them includes a current collector 3a, and positive electrode active material-containing layers 3b formed on both surfaces of the current collector 3a. A plural of negative electrodes 4 are present, and each of them includes a current collector 4a, and negative electrode active material-containing layers 4b formed on both surfaces of the current collector 4a. The current collector 4a of each of the negative electrodes 4 protrudes from the positive electrode 3 at one side. The protruding current collector 4a is electrically connected to a strip-shaped negative electrode terminal 6. The tip of the strip-shaped negative electrode terminal 6 is drawn out of the container 2. In addition, not shown, the current collector 3a of the positive electrode 3 protrudes from the negative electrode 4 at the side opposed to the protruding side of the current collector 4a. The current collector 3a protruding from the negative electrode 4 is electrically connected to a strip-shaped positive electrode terminal 7. The tip of the strip-shaped positive electrode terminal 7 is located at the side opposite to the negative electrode terminal 6, and drawn out of the side of the container 2.

Figure 3:
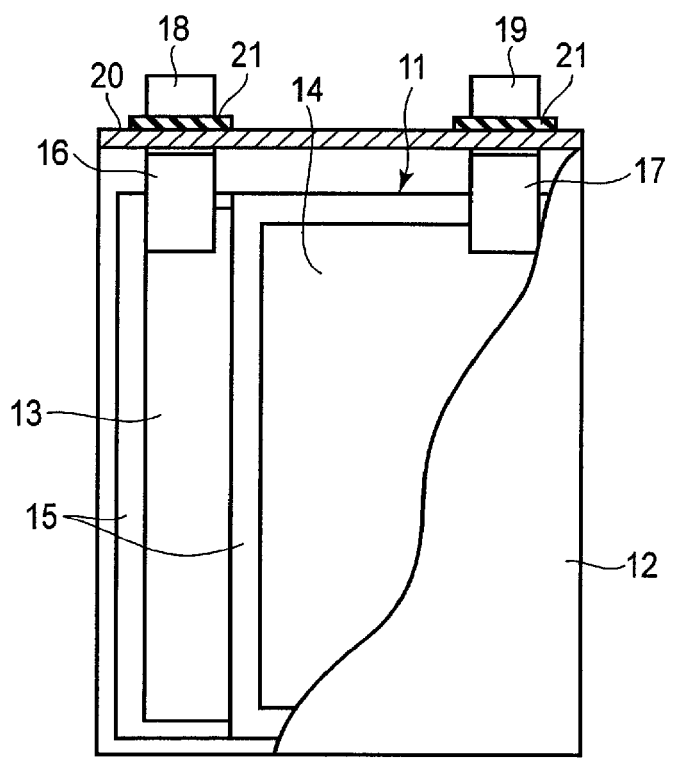
FIG. 3 is a partially cutaway cross-sectional view of a nonaqueous electrolyte battery of an embodiment.
Figure 4:
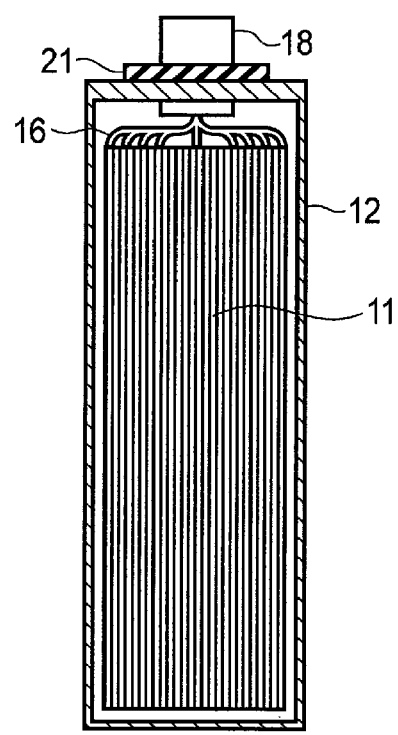
FIG. 4 is a side view of the battery of FIG. 3.

FIGS. 3 and 4 show an example of a nonaqueous electrolyte battery including a metal container.

An electrode group 11 is housed in a rectangular cylindrical metal container 12. The electrode group 11 has a structure in which a separator 15 is provided between a positive electrode 13 and a negative electrode 14 and spirally wound to form a flat shape. A nonaqueous electrolyte (not shown) is supported by the electrode group 11. As shown in FIG. 4, strip-shaped positive electrode leads 16 are electrically connected to a plural of places of the end portion of the positive electrode 13 which are located on the end surface of the electrode group 1. Strip-shaped negative electrode leads 17 are electrically connected to a plural of places of the end portion of the negative electrode 14 which are located on the end surface. A bundle of the positive electrode leads 16 is electrically connected to a positive electrode conductive tab 18. A positive electrode terminal is formed of the positive electrode leads 16 and the positive electrode conductive tab 18. A bundle of the negative electrode leads 17 is connected to a negative electrode conductive tab 19. A negative electrode terminal is formed of the negative electrode leads 17 and the negative electrode conductive tab 19. A metal sealing plate 20 is fixed to the opening part of the metal container 12 by welding or the like. The positive electrode conductive tab 18 and the negative electrode conductive tab 19 are pulled out from pick-up holes formed in the sealing plate 20 to the outside. The inner periphery surface of each pick-up hole of the sealing plate 20 is covered with an insulating member 21 in order to prevent short circuits due to the contact of the sealing plate 20 and the positive electrode conductive tab 18 or the contact of the sealing plate 20 and the negative electrode conductive tab 19.

Since the nonaqueous electrolyte battery of the second embodiment described above includes the negative electrode containing the negative electrode active material according to the first embodiment, high temperature cycle life performance and large current discharge performance can be improved.

(Third Embodiment)

A third embodiment provides a battery module including nonaqueous electrolyte batteries as unit cells, and a battery pack including the battery module. The nonaqueous electrolyte battery may be the nonaqueous electrolyte battery of the second embodiment.

Examples of the battery module include those including a plural of unit cells which are electrically connected in series or parallel, and those including a unit including a plural of unit cells which are electrically connected in series, or another unit including a plural of unit cells which are electrically connected in parallel.

Examples of the form of series or parallel electrical connection of a plural of nonaqueous electrolyte batteries include series or parallel electrical connection of a plural of batteries each having a container, and series or parallel electrical connection of a plural of electrode groups housed in a common case. According to a specific example of the former, positive and negative electrode terminals of a plural of nonaqueous electrolyte batteries are connected by a metal bus bar (for example, aluminum, nickel, and copper). According to a specific example of the latter, a plural of electrode groups are housed in one case with each of the electrode groups electrochemically insulated by a diaphragm, and the electrode groups are electrically connected in series. When the number of the batteries electrically connected in series is from 5 to 7, appropriate voltage compatibility with a lead storage battery is achieved. In order to further improve the voltage compatibility for the lead storage battery, five or six unit cells are preferably connected in series.

As a case which houses the battery module, a metal can made of an aluminum alloy, iron or stainless steel or the like, and a plastic container or the like can be used. The thickness of the container is desirably set to 0.5 mm or more. An example of the battery module will be described with reference to FIG. 5. A battery module 31 shown in FIG. 5 includes a plural of prismatic-shaped nonaqueous electrolyte batteries $32_1$ to $32_5$ according to the second embodiment as unit cells. The positive electrode conductive tab 18 of the battery $32_1$ and the negative electrode conductive tab 19 of the battery $32_2$ located next to the battery $32_1$ are electrically connected by a lead 33. Furthermore, the positive electrode conductive tab 18 of the battery $32_2$ and the negative electrode conductive tab 19 of the battery $32_3$ located next to the battery $32_2$ are electrically connected by the lead 33. Thus, the batteries $32_1$ to $32_5$ are connected in series.

An example of the battery pack including the battery module including the nonaqueous electrolyte battery shown in FIGS. 1 and 2 will be described with reference to FIG. 6. A battery pack 40 includes a case 41 and a battery module 42 housed in the case. 41. The battery module 42 is obtained by electrically connecting a plural of (for example, 5) nonaqueous electrolyte batteries $43_1$ to $43_5$ in series. The nonaqueous electrolyte batteries $43_1$ to $43_5$ are laminated in a thickness direction. The case 41 has an opening part 44 formed on each of an upper part and four side surfaces. A side surface in which the positive and negative electrode terminals 6 and 7 of the nonaqueous electrolyte batteries $43_1$ to $43_5$ protrude is exposed to the opening part 44 of the case 41. The output positive electrode terminal 45 of the battery module 42 is in a strip-shaped form. One end thereof is electrically connected to the positive electrode terminal 6 of any of the nonaqueous electrolyte batteries $43_1$ to $43_5$, and the other end protrudes from the opening part 44 of the case 41, and protrudes from the upper part of the case 41. On the other hand, the output negative electrode terminal 46 of the battery module 42 is in a strip-shaped form. One end thereof is electrically connected to the negative electrode terminal 7 of any of the nonaqueous electrolyte batteries $43_1$ to $43_5$, and the other end protrudes from the opening part 44 of the case 41, and protrudes from the upper part of the case 41.

Another examples of the battery pack is described in detail with reference to FIGS. 7 and 8. A plural of unit cells 51 including the flat nonaqueous electrolyte battery are laminated in such a manner that a negative electrode terminal 52 and a positive electrode terminal 53 extending out are oriented in the same direction, and bound by an adhesive tape 54 to constitute a battery module 55. These unit cells 51 are electrically serially connected to each other as shown in FIG. 8.

A printed wiring board 56 is located opposed to a side surface of the unit cells 51 from which the negative electrode terminal 52 and the positive electrode terminal 53 extend. As shown in FIG. 8, a thermistor 57, a protective circuit 58, and a power distribution terminal 59 to an external device are mounted on the printed wiring board 56. An insulating plate (not shown) is attached to a surface of the printed wiring board 56 opposite to the battery module 55, thereby avoiding unnecessary connection with the wiring of the battery module 55.

A positive electrode lead 60 is connected to the positive electrode terminal 53 located on the lowermost layer of the battery module 55, and its tip is inserted into and electrically connected to a positive electrode connector 61 of the printed wiring board 56. A negative electrode lead 62 is connected to the negative electrode terminal 52 located on the uppermost layer of the battery module 55, and its tip is inserted into and electrically connected to a negative electrode connector 63 of the printed wiring board 56. These connectors 61 and 63 are connected to the protective circuit 58 through wirings 64 and 65 on the printed wiring board 56.

The thermistor 57 is used to detect the temperature of the unit cells 51, and the detection signal is sent to the protective circuit 58. The protective circuit 58 can shut down a plus wiring 66a and a minus wiring 66b between the protective circuit 58 and the power distribution terminals 59 to an external device under a predetermined condition. For example, the predetermined condition indicates when the detection temperature of the thermistor 57 becomes a predetermined temperature or higher. The predetermined condition indicates when the over-charge, over-discharge, and over-current of the unit cells 51 are detected. The over-charge detection is performed on each of the unit cells 51 or the battery module 55. When each of the unit cells 51 is detected, the battery voltage may be detected, or a positive electrode or negative electrode potential may be detected. In the case of the latter, a lithium electrode to be used as a reference electrode is inserted into each of the unit cells 51. In the case of FIGS. 7 and 8, wirings 67 for voltage detection are connected to the unit cells 51 and detection signals are sent to the protective circuit 58 through the wirings 67.

Protective sheets 68 made of rubber or resin are arranged on three side surfaces of the battery module 55 except the side surface in which the positive electrode terminal 53 and the negative electrode terminal 52 protrude.

The battery module 55 is housed in a housing container 69 together with each of the protective sheets 68 and the printed wiring board 56. That is, the protective sheets 68 are arranged on both internal planes in a long side direction and on one of the internal planes in a short side direction of the housing container 69. The printed wiring board 56 is arranged on the other internal plane at the opposite side in a short side direction. The battery module 55 is located in a space surrounded by the protective sheets 68 and the printed wiring board 56. A lid 70 is attached to the upper plane of the housing container 69.

In order to fix the battery module 55, a heat-shrinkable tape may be used in place of the adhesive tape 54. In this case, the battery module is bound by placing the protective sheets on the both surfaces of the battery module, revolving the heat-shrinkable tape, and thermally shrinking the heat-shrinkable tape.

Figure 7:
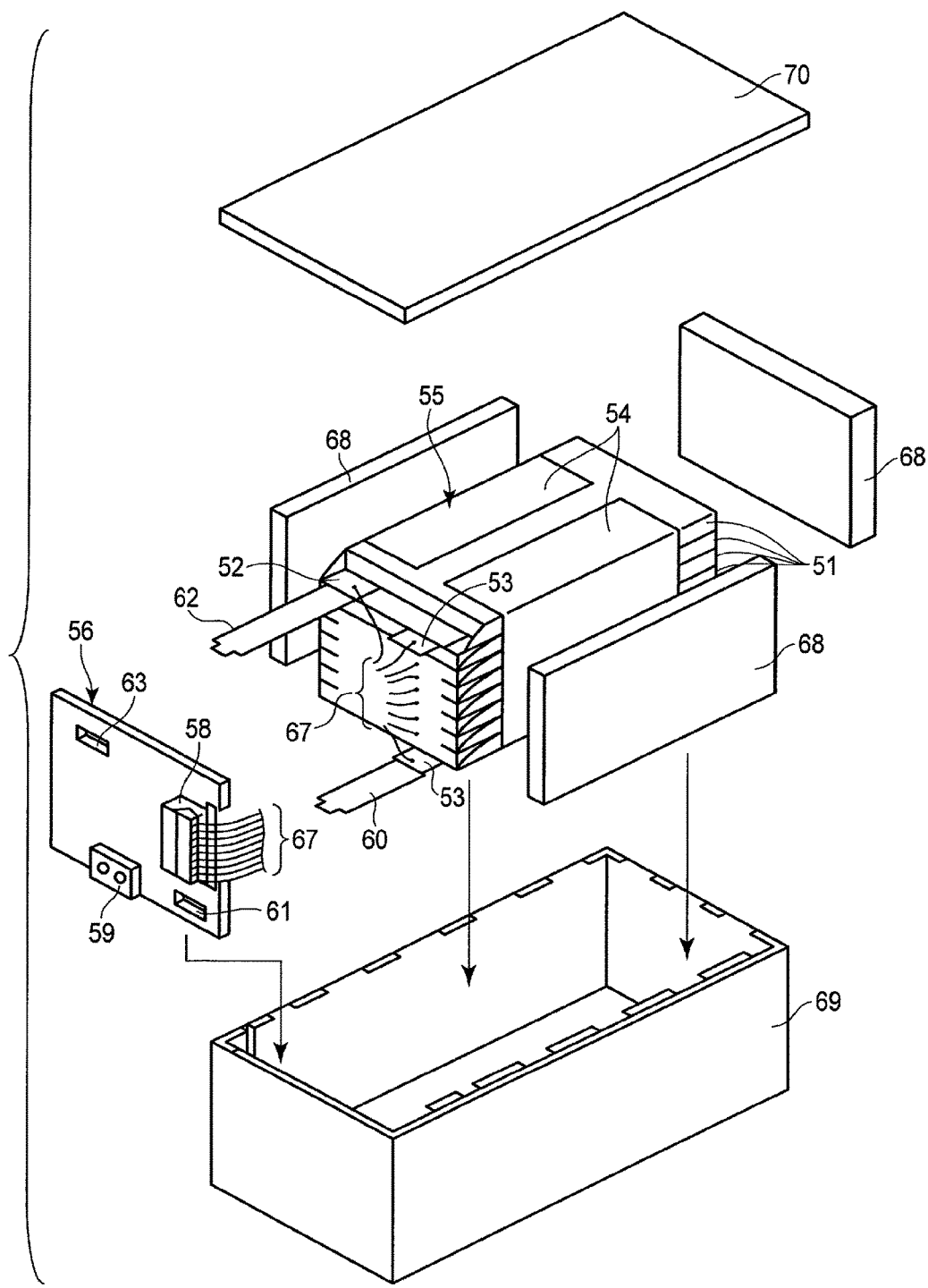
FIG. 7 is an exploded perspective view of a battery pack according to an embodiment.
Figure 8:
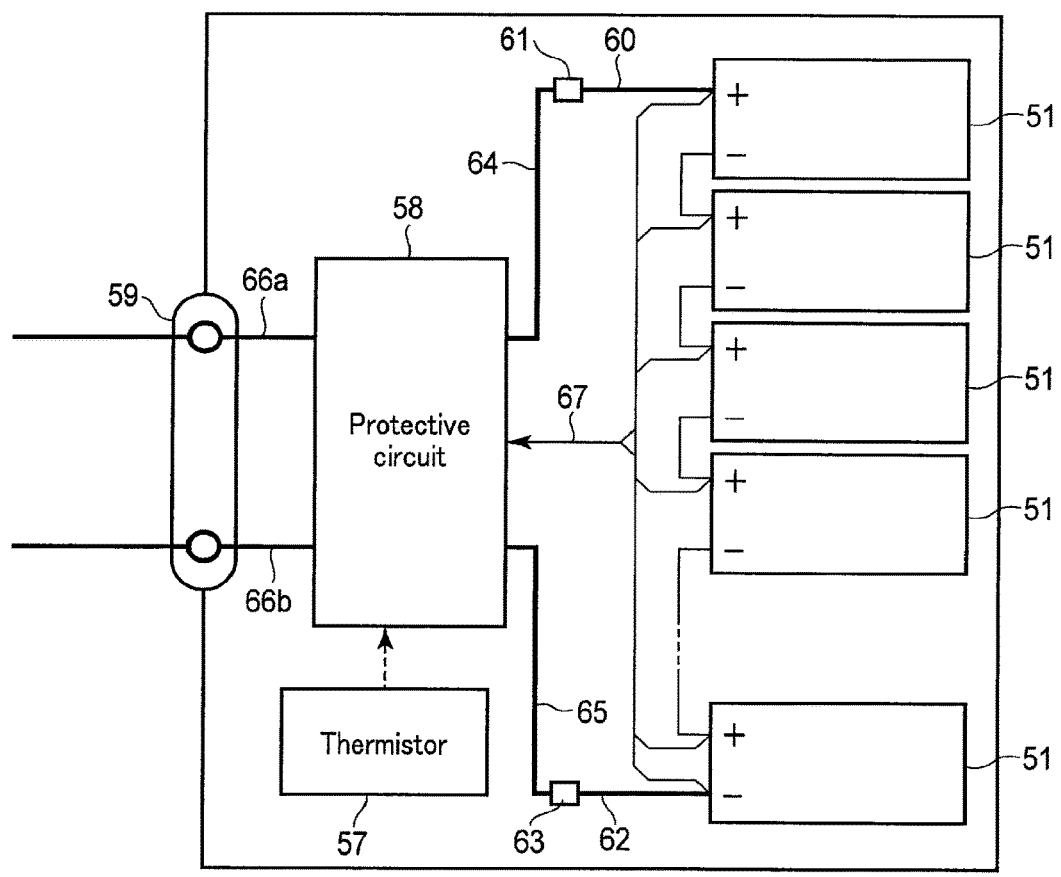
FIG. 8 is a block diagram showing an electric circuit of the battery pack of FIG. 7.

In FIGS. 7 and 8, the form in which the unit cells 51 are connected in series is shown. However, in order to increase the battery capacity, the cells may be connected in parallel. The assembled battery pack can be connected in series or in parallel.

The aspect of the battery pack is appropriately changed according to the application. The battery pack is preferably used for the application which requires excellent charge and discharge at a high current. Specifically, the battery pack is used as a power source for digital cameras, for vehicles such as two- or four-wheel hybrid electric automobiles, for two- or four-wheel electric automobiles, or for assisted bicycles. Particularly, the battery pack is suitably used for vehicles.

The third embodiment described above includes the non-aqueous electrolyte battery of the second embodiment, and thereby the battery module and the battery pack having improved charge-and-discharge cycle life performance and large current discharge performance at a high temperature can be provided. Therefore, the battery module and the battery pack can be provided, which are suitable as a power source alternative to lead batteries used as a power source starting a vehicle, or as in-vehicle secondary batteries installed in a hybrid vehicle.

EXAMPLES

Hereinafter, Examples will be described in detail with reference to the drawings, but the present invention is not limited to the following Examples.

Example 1

An olivine structured $LiMn_{0.85}Fe_{0.1}Mg_{0.05}PO_4$ particles had an average primary particle size of 50 nm. Surfaces of the particles were coated with carbon material particles having an average particle size of 5 nm. Amount of the carbon material particles was 1% by weight. The particles coated with the carbon material particles were used as a positive electrode active material. For the active material, 3% by weight of vapor grown carbon fibers having a fiber diameter of 0.1 μm based on the total weight of a positive electrode as conductive agents and 5% by weight of a graphite powder based on the total weight of the positive electrode as conductive agents, and 5% by weight of PVdF based on the total weight of the positive electrode as a binder were mixed and dispersed in an n-methylpyrrolidone (NMP) solvent to prepare a slurry. The obtained slurry was applied to both surfaces of an aluminum alloy foil (purity: 99%) having a thickness of 15 μm, followed by drying and pressing to produce a positive electrode which has a positive electrode material layer formed on each surface and having a thickness of 43 μm and an electrode density of 2.2 g/cm$^3$. The specific surface area of the positive electrode material layer was 5 m$^2$/g.

A negative electrode active material was produced by the following method. After $SrCO_3$, $TiO_2$, and $Li_2CO_3$ were prepared in stoichiometric proportions, and subjected to a temporary firing treatment at 650° C. for 2 hours, these were pulverized to obtain a powder. The powder and a polyvinyl alcohol liquid of a carbon precursor were mixed, and the mixture was sprayed, followed by drying. The obtained powder was subjected to a main firing treatment at 1100° C. under an inert atmosphere with an argon flow, to obtain a negative electrode active material powder.

The obtained negative electrode active material powder was subjected to X-ray diffraction and elemental analysis, and thereby it could be confirmed that the negative electrode active material is obtained by covering the surface of a $Li_2SrTi_6O_{13.9}$ powder with 1% by weight of a carbon material layer; the average primary particle size of the negative electrode active material is 0.8 μm; the true density of the negative electrode active material is 3.85 g/cm$^3$ (excluding the carbon material); and $Li_2SrTi_6O_{13.9}$ has a crystal structure of a space group Cmca. The negative electrode active material, an acetylene black powder as a conductive agent, a graphite powder having an average particle size of 6 μm, and PVdF as a binder were mixed in a weight ratio of 85:6:5:4 and dispersed in an n-methylpyrrolidone (NMP) solvent. The obtained dispersion was stirred at 1000 rpm for 2 hours by using a ball mill to prepare a slurry. The obtained slurry was applied to an aluminum alloy foil (purity: 99.3%) having a thickness of 15 μm, followed by drying and heat pressing to produce a negative electrode having both surfaces on which the negative electrode material layer having a thickness of 59 μm and having an electrode density of 2.8 g/cm$^3$ was present. The BET specific surface area (surface area per 1 g of the negative electrode material layer) of the negative electrode material layer was 8 m$^2$/g.

A method for measuring the particles of the negative electrode active material will be described below.

A laser diffraction particle size analyzer (SALD-300 manufactured by Shimadzu Corporation) was used for the measurement of the particle of the negative electrode active material. First, about 0.1 g of a sample, a surfactant, and 1 to 2 mL of distilled water were placed in a beaker, and then thoroughly stirred. The solution was then injected into a stirring water vessel. The light intensity distribution was measured 64 times at an interval of 2 seconds, to obtain particle size distribution data. After confirming that the negative electrode active material is the primary particle from an electron microscope photograph, the D50 value of particle size distribution was taken as the average particle size of the primary particles.

The BET specific surface areas of the negative electrode active material and negative electrode were measured using $N_2$ adsorption under the following conditions.

1 g of a powdered negative electrode active material was used as a sample, or two negative electrodes of 2×2 cm$^2$ were prepared as samples by cutting. As the BET specific surface area measuring device, a device manufactured by Yuasa Ionics Inc. was used, and nitrogen gas was used as an adsorption gas.

The porosity of the negative electrode was calculated as follows: the volume of the negative electrode material layer was compared with that of the negative electrode material layer having a porosity of 0%, and an increase in volume from the volume of the negative electrode material layer having a porosity of 0% was regarded as a pore volume. When the negative electrode material layer was formed on both surfaces of the current collector, the volume of the negative electrode material layer was the total volume of the negative electrode material layers formed on both surfaces.

From the positive electrode and the negative electrode, a battery was manufactured by the following method. An electrode group obtained by laminating the positive electrodes, polyethylene porous films each having a thickness of 12 μm, and the negative electrodes was produced. Then, a plural of positive electrode aluminum foil current collectors were electrically connected to a strip-shaped positive electrode terminal, and a plural of negative electrode aluminum foil current collectors were electrically connected to a strip-shaped negative electrode terminal. The electrode group was inserted into a container (container member).

A lithium salt $LiPF_6$ was dissolved at a concentration of 1.5 mol/L in an organic solvent, which was prepared by mixing PC and DEC at a volume ratio of 2:1, to prepare a liquid nonaqueous electrolyte. The obtained nonaqueous electrolyte was injected into a container, and a slim nonaqueous electrolyte secondary battery was produced, which had the structure shown in FIG. 1 and had a laminate film case size (cup size) having a thickness of 6 mm, a width of 70 mm, and a height of 110 mm. In the obtained secondary battery, the negative electrode is used in the potential range of from 1.0 V (vs. Li/Li$^+$) to 1.8 V (vs. Li/Li$^+$) with respect to the electrode potential of a lithium metal when lithium ions are inserted (charged) and extracted (discharged).

Examples 2 to 16 and Comparative Examples 1 to 7

Nonaqueous electrolyte secondary batteries were produced in the same manner as that described in Example 1 described above using positive electrode active materials and negative electrode active materials shown in the following Table 1.

There were measured a discharge capacity (Ah) and open-circuit voltage (V) at a discharge rate of 50% of each of the obtained nonaqueous electrolyte secondary batteries of Examples and Comparative Examples when the obtained nonaqueous electrolyte secondary battery was charged at a constant current of 1 C (one hour rate) to 3 V at 25° C. for 90 minutes, and then discharged at 1 C to 1.5 V. A capacity retention ratio when the battery was discharged at 10 C was measured as large current discharge performance. A capacity when the battery was discharged at 1 C was defined as 100%. After each of the batteries was charged to the charge maximum voltage at a constant current of 3 C at 60° C., and discharged to 1.5 V at 3 C. Thereafter, the charge/discharge cycle was repeated for a 60° C. high temperature cycle test. The cycle number when the 80% capacity of the initial capacity was achieved was defined as a cycle life.

These measurement results are shown in the following Table 1.

TABLE 1

| | Positive electrode active material | Composition of composite oxide particle containing Li and Ti | Carbon material coating amount (% by weight) | Discharge capacity (Ah) | Voltage of 50% discharge rate (V) | 60° C. cycle life (time) | 10 C discharge retention ratio (%) |
|---|---|---|---|---|---|---|---|
| Example 1 | $LiMn_{0.85}Fe_{0.1}Mg_{0.05}PO_4$ | $Li_2SrTi_6O_{13.9}$ | 1 | 3.0 | 2.66 | 5000 | 85 |
| Example 2 | $LiMn_{0.85}Fe_{0.1}Mg_{0.05}PO_4$ | $Li_2SrTi_6O_{14}$ | 0.05 | 3.0 | 2.66 | 3000 | 70 |
| Example 3 | $LiMn_{0.85}Fe_{0.1}Mg_{0.05}PO_4$ | $Li_2SrTi_6O_{13.8}$ | 2 | 2.95 | 2.66 | 5500 | 90 |
| Example 4 | $LiMn_{0.85}Fe_{0.1}Mg_{0.05}PO_4$ | $Li_2SrTi_6O_{13.5}$ | 5 | 2.8 | 2.66 | 6000 | 95 |
| Example 5 | $LiMn_{0.85}Fe_{0.1}Mg_{0.05}PO_4$ | $Li_2SrTi_6O_{14}$ | 0.5 | 3.0 | 2.66 | 4000 | 75 |
| Example 6 | $LiMn_{0.85}Fe_{0.1}Mg_{0.05}PO_4$ | $Li_2BaTi_6O_{13.8}$ | 2 | 2.8 | 2.7 | 5000 | 80 |
| Example 7 | $LiMn_{0.85}Fe_{0.1}Mg_{0.05}PO_4$ | $Li_2NaTi_5TaO_{13.8}$ | 2 | 2.5 | 2.8 | 5000 | 80 |
| Example 8 | $LiMn_{0.85}Fe_{0.1}Mg_{0.05}PO_4$ | $Li_2KTi_5TaO_{14}$ | 0.05 | 2.8 | 2.7 | 5000 | 80 |
| Example 9 | $LiMn_{0.85}Fe_{0.1}Mg_{0.05}PO_4$ | $Li_2NaTi_5NbO_{13.9}$ | 1 | 2.7 | 2.7 | 6000 | 80 |
| Example 10 | $LiMn_{0.85}Fe_{0.1}Mg_{0.05}PO_4$ | $Li_2Sr_{0.5}Ca_{0.5}Ti_6O_{13.9}$ | 1 | 3.1 | 2.66 | 4000 | 85 |
| Example 11 | $LiMn_{0.85}Fe_{0.1}Mg_{0.05}PO_4$ | $Li_2Sr_{0.5}Na_{0.5}Ti_{5.5}Nb_{0.5}O_{14}$ | 1 | 2.9 | 2.7 | 5000 | 85 |
| Example 12 | $LiMn_{0.85}Fe_{0.1}Mg_{0.05}PO_4$ | $Li_2Sr_{0.5}Mg_{0.5}Ti_6O_{13.9}$ | 1 | 3.1 | 2.66 | 5000 | 85 |
| Example 13 | $LiMn_{0.1}Fe_{0.9}PO_4$ | $Li_2SrTi_6O_{13.9}$ | 1 | 3.2 | 2.0 | 10000 | 90 |
| Example 14 | $LiFe_{0.9}Mn_{0.1}SO_4F$ | $Li_2Sr_{0.5}Na_{0.5}Ti_{5.5}Nb_{0.5}O_{13.9}$ | 1 | 3.0 | 2.17 | 9000 | 85 |
| Example 15 | $LiFeSO_4F$ | $Li_2SrTi_6O_{14}$ | 1 | 3.0 | 2.16 | 8000 | 80 |
| Example 16 | $LiNi_{1/3}Co_{1/3}Mn_{1/3}O_2$ | $Li_2Sr_{0.5}Na_{0.5}Ti_{5.5}Nb_{0.5}O_{13.9}$ | 1 | 2.9 | 2.3 | 5000 | 85 |
| Comparative Example 1 | $LiMn_2O_4$ | $Li_4Ti_5O_{12}$ | 0 | 2.8 | 2.4 | 500 | 85 |
| Comparative Example 2 | $LiNi_{1/3}Co_{1/3}Mn_{1/3}O_2$ | $Li_4Ti_5O_{12}$ | 0 | 3.0 | 2.2 | 1000 | 80 |
| Comparative Example 3 | $LiMn_{0.85}Fe_{0.15}PO_4$ | $Li_4Ti_5O_{12}$ | 1 | 2.8 | 2.5 | 800 | 50 |
| Comparative Example 4 | $LiFePO_4$ | $Li_4Ti_5O_{12}$ | 0 | 2.8 | 1.86 | 2000 | 60 |
| Comparative Example 5 | $LiNi_{1/3}Co_{1/3}Mn_{1/3}O_2$ | $Li_2SrTi_6O_{14}$ | 0 | 2.9 | 2.3 | 1000 | 40 |
| Comparative Example 6 | $LiMn_{0.5}Fe_{0.5}PO_4$ | $Li_2SrTi_6O_{14}$ | 0 | 2.5 | 2.66 | 500 | 30 |
| Comparative Example 7 | $LiMn_2O_4$ | $Li_2SrTi_6O_{14}$ | 0 | 2.8 | 2.6 | 300 | 30 |

As apparent from Table 1, the nonaqueous electrolyte secondary batteries of Examples 1 to 16 have more excellent 60° C. high temperature cycle life performance than that of Comparative Examples 1 to 7. The batteries of Examples 1 to 16 have a high discharge capacity, a high voltage at a 50% discharge rate (high intermediate voltage), and a high 10 C discharge retention ratio. Therefore, according to Examples 1 to 16, it is possible to improve the 60° C. high temperature cycle life performance without impairing the discharge capacity, the voltage at the 50% discharge rate which is the intermediate voltage, and the 10 C discharge retention ratio.

Battery modules 1 and 2 including the nonaqueous electrolyte secondary battery of each of Examples and Comparative Examples as a unit cell were produced. From the nonaqueous electrolyte secondary batteries of Examples 1 to 16, the unit cells were electrically connected in 5 series or 6 series, to obtain battery modules 1 of Examples 17 to 32. From the nonaqueous electrolyte secondary batteries of Examples 1 to 16, the unit cells were electrically connected in 18 to 24 series, to obtain battery modules 2 of Examples 17 to 32. On the other hand, from the nonaqueous electrolyte secondary batteries of Comparative Examples 1 to 7, the unit cells were electrically connected in 5 to 7 series, to obtain battery modules 1 of Comparative Examples 8 to 14. From the nonaqueous electrolyte secondary batteries of Comparative Examples 1 to 7, the unit cells were electrically connected in 18 to 25 series, to obtain battery modules 2 of Comparative Examples 8 to 14.

There were measured open-circuit voltages (V) at the discharge rate of 50% of the obtained battery modules 1 of Examples 17 to 32 and Comparative Examples 8 to 14 when the battery modules 1 were charged at a constant current of 1 C (one hour rate) at 25° C. to 15 V for 90 minutes, and then discharged at 1 C to 10.5 V. A capacity retention ratio when the battery having the discharge rate of 50% was discharged at 10 C was measured as large current discharge performance. The capacity when the battery having the discharge rate of 50% was discharged at 1 C was defined as 100%. On the other hand, there were measured open-circuit voltages (V) at the discharge rate of 50% of the battery modules 2 of Examples 17 to 32 and Comparative Examples 8 to 14 when the battery modules 2 were charged at a constant current of 1 C (one hour rate) at 25° C. to 54 V for 90 minutes, and then discharged at 1 C to 38 V. A capacity retention ratio when the battery having the discharge rate of 50% was discharged at 10 C was measured as large current discharge performance. The capacity when the battery having the discharge rate of 50% was discharged at 1C was defined as 100%. These measurement results are shown in the following Table 2.

As apparent from Table 2, the battery modules 1 connected in 5 series or 6 series in Examples 17 to 32 have a high voltage equivalent to, or equal to or higher than that of the battery modules 1 connected in 5 series to 7 series in Comparative Examples 8 to 14, and have more excellent large current discharge performance. The battery modules 2 connected in 18 series to 24 series in Examples 17 to 32 have a high voltage equivalent to, or equal to or higher than that of the battery modules 2 connected in 18 series to 25 series in Comparative Examples 8 to 14, and have more excellent large current discharge performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode active material comprising:

particles represented by $Li_{2+a}A_dTi_{6-b}B_bO_{14-c}$, where A is at least one element selected from the group consisting of Na, K, Mg, Ca, Ba, and Sr; B is at least one element selected from the group consisting of Nb and Ta; and a, b, c, and d respectively satisfy $0 \leq a \leq 5$, $0 < b \leq 6$, $0 \leq c \leq 0.6$, and $0 \leq d \leq 3$; and

TABLE 2

| | Nonaqueous electrolyte secondary battery | The number of batteries connected in series in battery module 1 (piece) | The number of batteries connected in series in battery module 2 (piece) | Voltage of battery module 1 (V) | Voltage of battery module 2 (V) | Capacity retention ratio of battery module 1 (%) | Capacity retention ratio of battery module 2 (%) |
|---|---|---|---|---|---|---|---|
| Example 17 | Example 1 | 5 | 18 | 13.3 | 47.9 | 75 | 80 |
| Example 18 | Example 2 | 5 | 18 | 13.3 | 47.9 | 65 | 70 |
| Example 19 | Example 3 | 5 | 18 | 13.3 | 47.9 | 80 | 85 |
| Example 20 | Example 4 | 5 | 18 | 13.3 | 47.9 | 85 | 90 |
| Example 21 | Example 5 | 5 | 18 | 13.3 | 47.9 | 65 | 70 |
| Example 22 | Example 6 | 5 | 18 | 13.5 | 48.6 | 70 | 75 |
| Example 23 | Example 7 | 5 | 18 | 14 | 50.4 | 75 | 80 |
| Example 24 | Example 8 | 5 | 18 | 13.5 | 48.6 | 75 | 80 |
| Example 25 | Example 9 | 5 | 18 | 13.5 | 48.6 | 75 | 80 |
| Example 26 | Example 10 | 5 | 18 | 13.3 | 47.9 | 75 | 80 |
| Example 27 | Example 11 | 5 | 18 | 13.5 | 48.6 | 75 | 80 |
| Example 28 | Example 12 | 5 | 18 | 13.3 | 47.9 | 75 | 80 |
| Example 29 | Example 13 | 6 | 24 | 12 | 48.0 | 60 | 65 |
| Example 30 | Example 14 | 6 | 22 | 13 | 47.7 | 70 | 75 |
| Example 31 | Example 15 | 6 | 22 | 13 | 47.5 | 65 | 70 |
| Example 32 | Example 16 | 6 | 21 | 13.8 | 48.3 | 80 | 85 |
| Comparative Example 8 | Comparative Example 1 | 5 | 20 | 12 | 48 | 20 | 30 |
| Comparative Example 9 | Comparative Example 2 | 6 | 22 | 13.2 | 48.4 | 30 | 40 |
| Comparative Example 10 | Comparative Example 3 | 5 | 19 | 12.5 | 47.5 | 15 | 30 |
| Comparative Example 11 | Comparative Example 4 | 7 | 25 | 13 | 46.5 | 20 | 20 |
| Comparative Example 12 | Comparative Example 5 | 6 | 21 | 13.8 | 48.3 | 35 | 40 |
| Comparative Example 13 | Comparative Example 6 | 6 | 24 | 12 | 48 | 10 | 20 |
| Comparative Example 14 | Comparative Example 7 | 5 | 18 | 13.5 | 46.8 | 35 | 35 | a carbon material covering at least a part of surfaces of the particles;

wherein a true density of the negative electrode active material excluding the carbon material is from 3.5 g/cm$^3$ to 4.8 g/cm$^3$.

2. The negative electrode active material according to claim 1, wherein a content of the carbon material is from 0.05% by weight to 5% by weight.

3. The negative electrode active material according to claim 1, wherein A is at least one element selected from the group consisting of Na and K.

4. A nonaqueous electrolyte battery comprising:
a positive electrode;
a negative electrode comprising the negative electrode active material according to claim 1; and
a nonaqueous electrolyte.

5. The nonaqueous electrolyte battery according to claim 4, wherein the positive electrode comprises a first positive electrode active material represented by $Li_xFe_{1-w}Mn_wSO_4F$ wherein $0 \leq x \leq 1.1$, $0 \leq w \leq 0.2$, and a second positive electrode active material represented by $Li_xFe_{1-y-z}Mn_yM_zPO_4$ wherein M is at least one element selected from the group consisting of Mg, Al, Ti, and Zr, and $0 \leq x \leq 1.1$, $0 \leq y \leq 1$, $0 \leq z \leq 0.2$.

6. A battery pack comprising a battery module comprising the nonaqueous electrolyte batteries according to claim 4 electrically connected in 5 series, 6 series, or from 18 to 24 series.

7. A battery pack comprising a battery module comprising the nonaqueous electrolyte battery according to claim 4.

8. The battery pack according to claim 7, which further comprises a protective circuit and an external power distribution terminal.

9. A vehicle comprising the battery pack according to claim 7.

10. The vehicle according to claim 9, which is an idling stop vehicle with a regenerative function.

11. The negative electrode active material according to claim 1, wherein the carbon material has a layer form, a particle form or a fiber form.

12. A negative electrode comprising the negative electrode active material according to claim 1.

13. The negative electrode according to claim 12, wherein the negative electrode is used in a potential range of 2 to 0.5 V vs. Li/Li$^+$ with respect to an electrode potential of a lithium metal during insertion and extraction of lithium ions.

14. The negative electrode according to claim 12, wherein the negative electrode active material comprises single primary particles, secondary particles or a mixture thereof.

15. The negative electrode according to claim 12 which comprises a negative electrode material layer comprising the negative electrode active material and a conductive agent comprising at least one selected from the group consisting of acetylene black, carbon black, cokes, carbon fibers, graphite, $Li_4Ti_5O_{12}$, metal compound powders, and metal powders.

* * * * *